(12) United States Patent
Ito

(10) Patent No.: US 11,159,683 B2
(45) Date of Patent: Oct. 26, 2021

(54) INFORMATION PROCESSING APPARATUS INCLUDING A PLURALITY OF NETWORK INTERFACES AND CONTROL METHOD THEREOF

(71) Applicant: CANON KABUSHIKI KAISHA, Tokyo (JP)

(72) Inventor: Koichi Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/847,430

(22) Filed: Apr. 13, 2020

(65) Prior Publication Data

US 2020/0244823 A1 Jul. 30, 2020

Related U.S. Application Data

(62) Division of application No. 16/211,077, filed on Dec. 5, 2018, now Pat. No. 10,659,629.

(30) Foreign Application Priority Data

Dec. 14, 2017 (JP) .............................. JP2017-239306

(51) Int. Cl.
*H04N 1/00* (2006.01)
*H04W 4/80* (2018.01)
*H04W 76/11* (2018.01)
*H04W 8/26* (2009.01)
(Continued)

(52) U.S. Cl.
CPC .......... *H04N 1/00315* (2013.01); *H04W 4/80* (2018.02); *H04W 8/26* (2013.01); *H04W 48/08* (2013.01); *H04W 76/11* (2018.02); *H04L 61/2007* (2013.01); *H04L 61/2038* (2013.01); *H04L 61/6022* (2013.01); *H04N 2201/006* (2013.01); *H04N 2201/0094* (2013.01)

(58) Field of Classification Search
None
See application file for complete search history.

(56) References Cited

U.S. PATENT DOCUMENTS 10,129,499 B1* 11/2018 Boone .................. H04L 9/0662
2019/0097993 A1* 3/2019 Iwashita ................ G06F 21/31

FOREIGN PATENT DOCUMENTS

| JP | 2011-182449 A | ‡ | 9/2011 |
| JP | 2016-170618 A | ‡ | 9/2016 |

* cited by examiner
‡ imported from a related application

*Primary Examiner* — Lennin R Rodriguezgonzalez
(74) *Attorney, Agent, or Firm* — Canon U.S.A., Inc. IP Division

(57) ABSTRACT

An information processing apparatus that communicates directly with an external apparatus using wireless communication includes a plurality of network interfaces, a storage unit that stores a plurality of pieces of different network information respectively assigned to the plurality of network interfaces, an identification unit that identifies a user who logged in the information processing apparatus, a selection unit that selects, as network information to be transmitted directly to the external apparatus using the wireless communication, at least one network information corresponding to the identified user from among the stored plurality of pieces of network information, and a transmission unit that transmits the selected network information directly to the external apparatus using the wireless communication.

22 Claims, 17 Drawing Sheets

(51) Int. Cl.
*H04W 48/08* (2009.01)
*H04L 29/12* (2006.01)

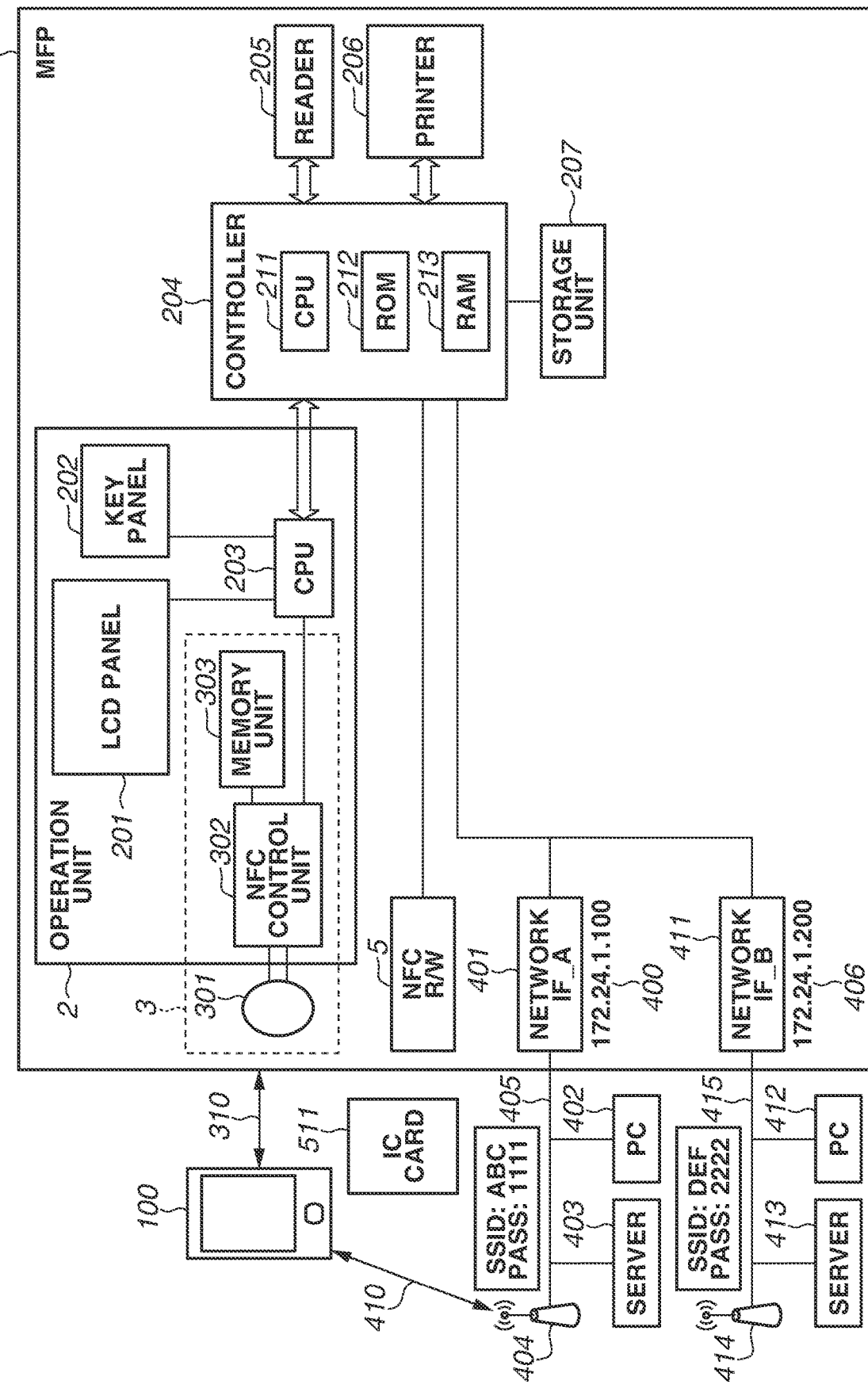

FIG.4

| ID | NETWORK IFGr | IP ADDRESS | ACCESS POINT SSID | ACCESS POINT PASSWORD |
|---|---|---|---|---|
| (1) | NETWORK IFA-Gr | 172.24.1.100 | ABC | 1111 |
| (2) | | | | |
| (3) | NETWORK IFB-Gr | 172.24.1.200 | DEF | 2222 |
| (4) | | | | |

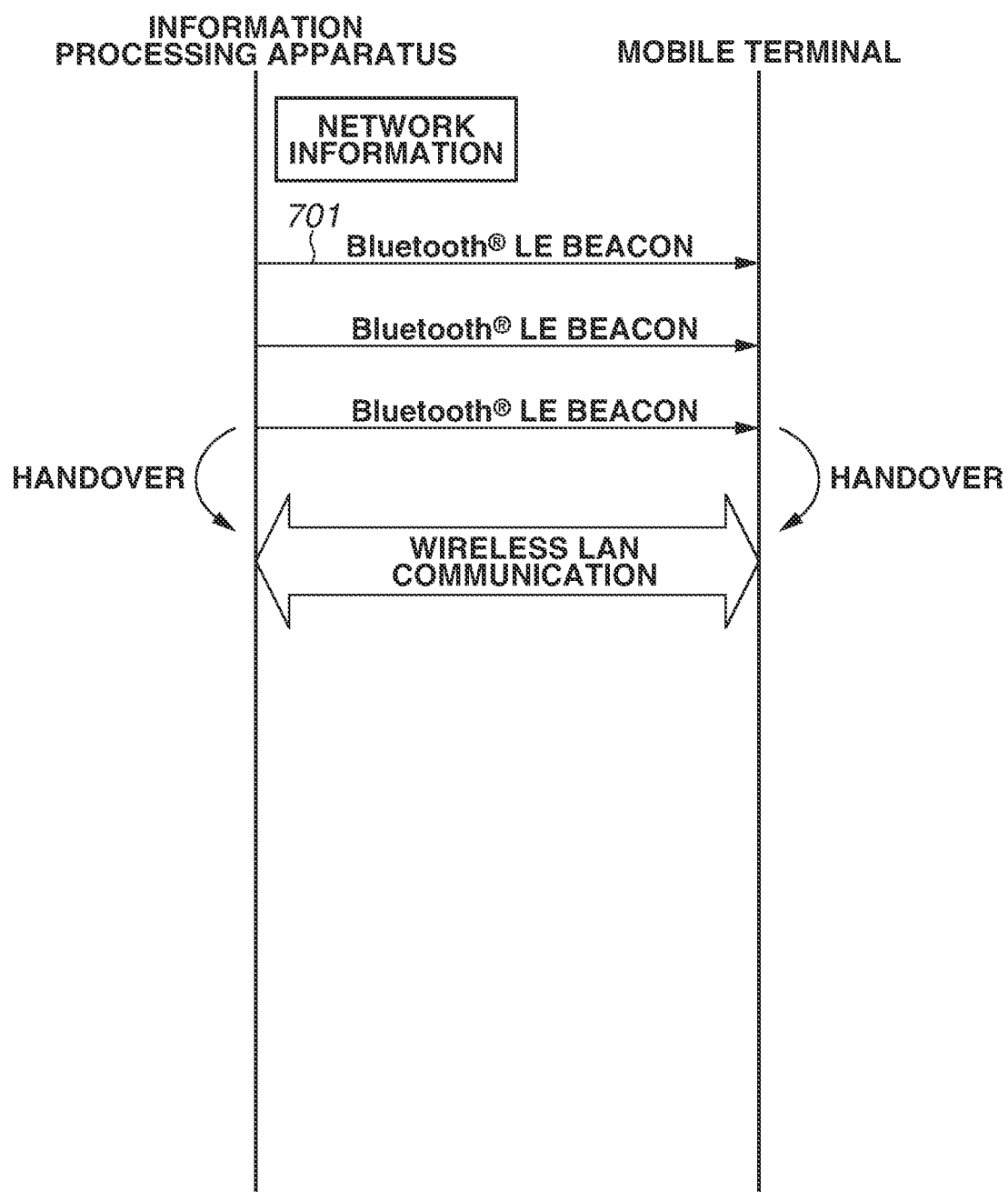

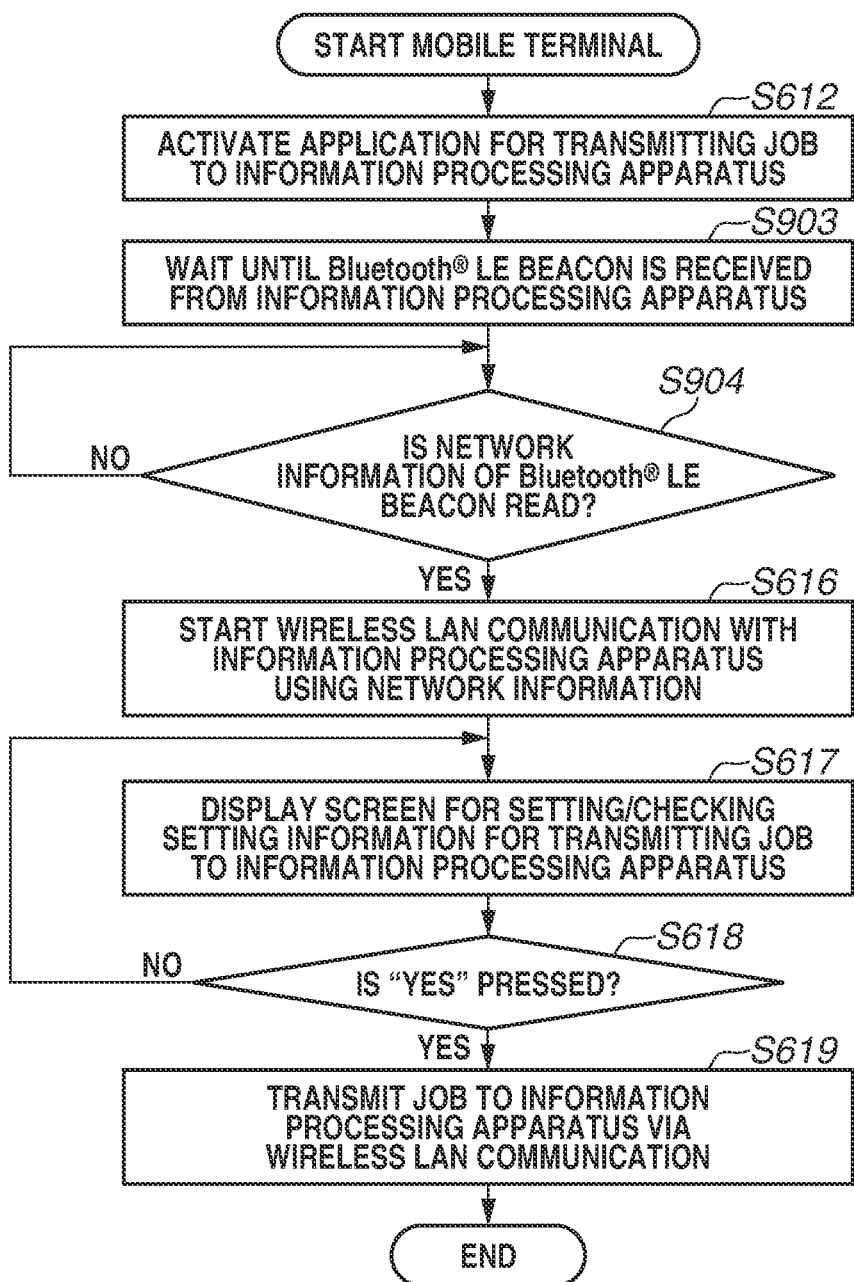

OPERATION SCREEN FOR QR CODE

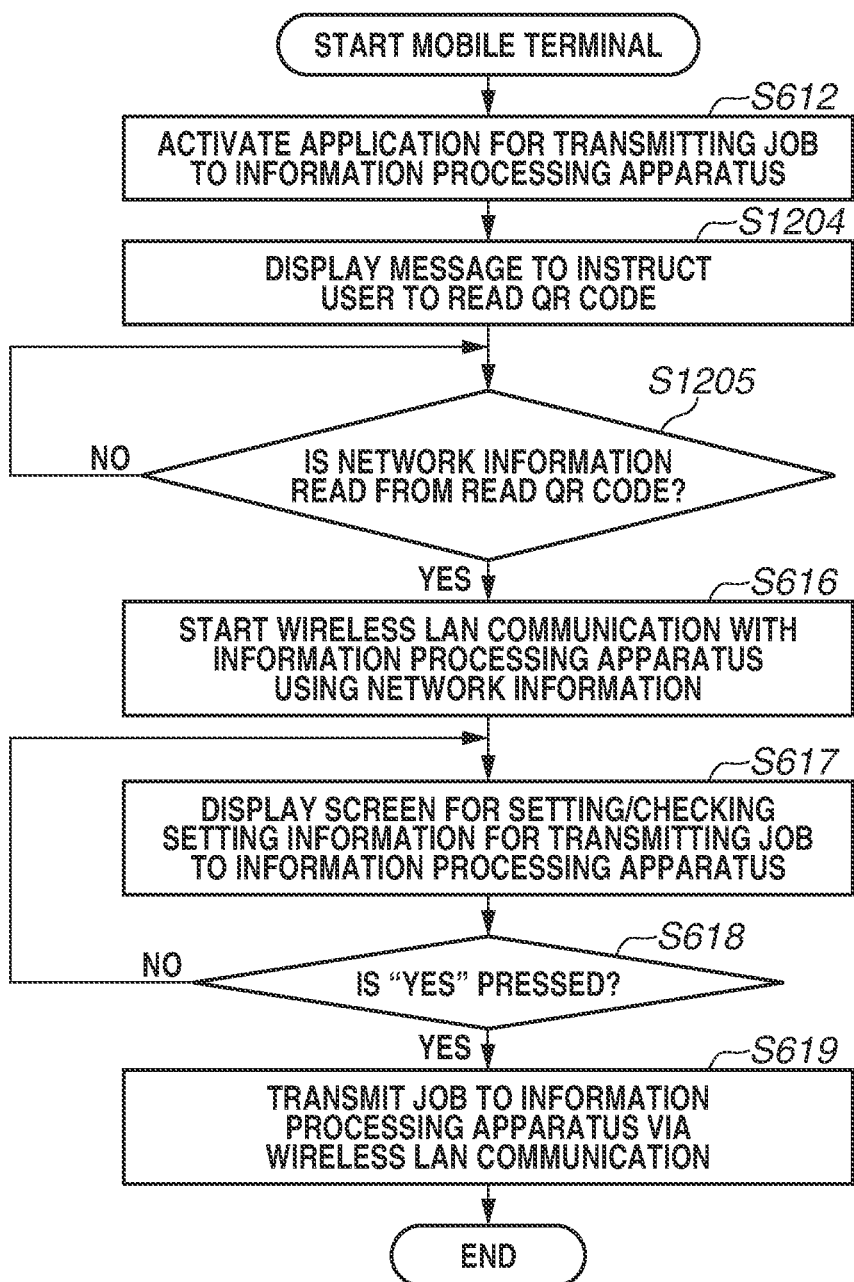

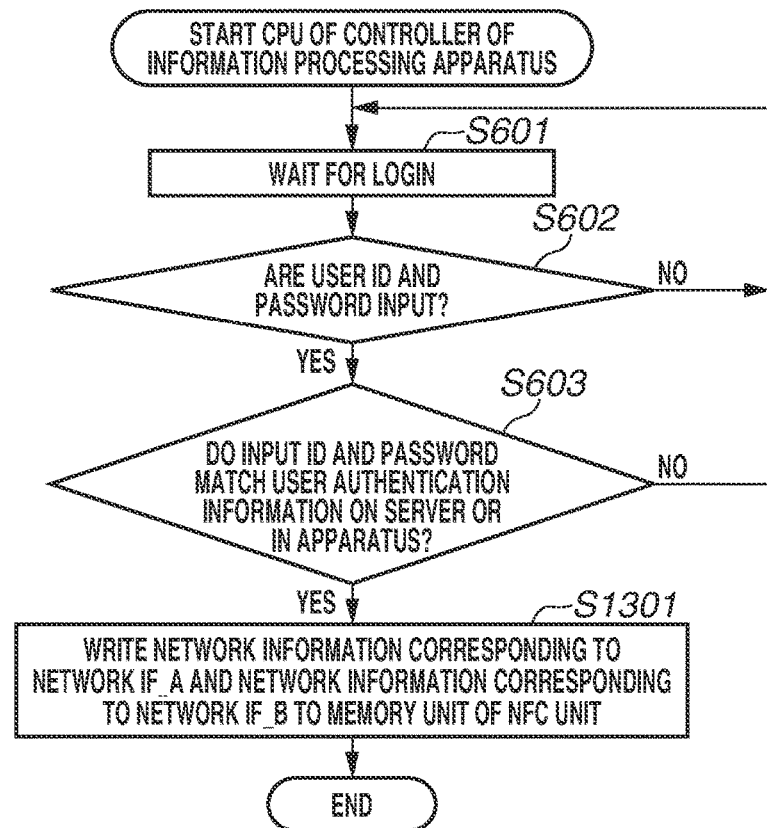
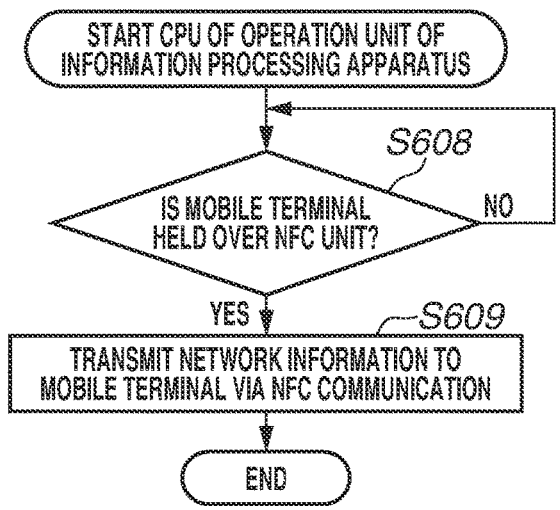
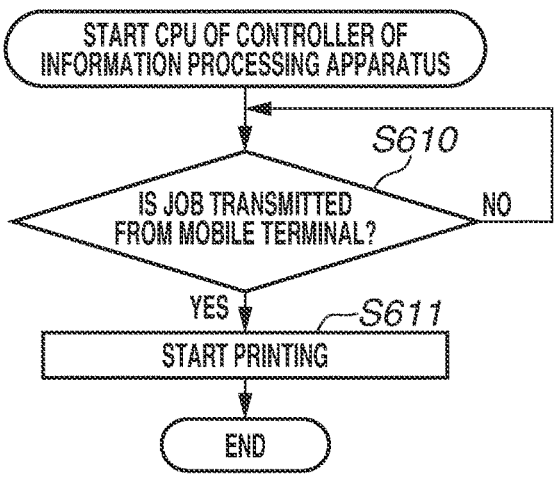

INFORMATION PROCESSING APPARATUS INCLUDING A PLURALITY OF NETWORK INTERFACES AND CONTROL METHOD THEREOF

CROSS-REFERENCE TO RELATED APPLICATIONS

This application is a Divisional of U.S. application Ser. No. 16/211,077, which was filed on Dec. 5, 2018 and which claims priority to Japanese Patent Application No. 2017-239306, which was filed on Dec. 14, 2017, both of which are hereby incorporated by reference herein in their entirety.

BACKGROUND

Field

The present disclosure relates to an information processing apparatus including a plurality of network interfaces.

Description of the Related Art

In recent years, an information processing apparatus can wirelessly communicate with an external apparatus, etc. to receive data from the external apparatus and print the data. At this time, network information about the information processing apparatus is transmitted via a near field wireless unit such as a near field communication (NFC) unit included in the information processing apparatus so that the external apparatus and the information processing apparatus identify each other as their respective communication partners.

In a known technique, data to be printed, etc. is transmitted from the external apparatus to the information processing apparatus, or data is transmitted from the information processing apparatus to the external apparatus, using wireless communication that is different from and higher in speed than NFC, e.g., wireless local area network (LAN) communication. To perform wireless LAN communication, connection processing needs to be performed based on communication standards, and network information, such as a service set identifier (SSID), password, and Internet Protocol (IP) address for performing wireless LAN connection, authentication, and data transfer, needs to be set to the external apparatus. As used herein, the term "password" refers to an encryption key.

Japanese Patent Application Laid-Open No. 2011-182449 discusses a technique using a handover method in which an external apparatus acquires necessary network information for wireless LAN connection via a near field wireless unit and performs wireless LAN connection based on the acquired network information. In this way, a user is not required to conduct the bothersome work of wireless LAN registration and setting on the external apparatus, and handover is executable by reading the information from the near field wireless unit of the information processing apparatus.

There has been an increasing need for an information processing apparatus that can be shared by a plurality of groups while security is maintained. In response to such a need, Japanese Patent Application Laid-Open No. 2016-170618 discusses an information processing apparatus that includes a plurality of network interfaces, sets an allowed user for each network interface, and connects to a network.

However, in the information processing apparatus that includes the plurality of network interfaces and is to be connected to a plurality of networks, the user needs to provide an external apparatus with network information for connecting the external apparatus to an appropriate network.

In the method discussed in Japanese Patent Application Laid-Open No. 2016-170618, a user allowed to connect is set for each network interface. If network information about a network to which the user is not allowed to connect is provided to an external apparatus, the external apparatus cannot exchange data with the information processing apparatus.

Even in a case in which a user allowed to connect is not set for each network interface, network information that is provided can cause the user to connect an external apparatus to an inappropriate network. Consequently, for example, in a case in which a plurality of companies shares and uses a single information processing apparatus, a user of one of the companies can connect an external terminal to a network of another one of the companies, and can acquire confidential information, etc. of the other company.

SUMMARY

The present disclosure is directed to a technique by which an information processing apparatus that includes a plurality of network interfaces and is to be connected to a plurality of networks provides an external apparatus with network information that enables a user to connect the external apparatus to an appropriate network.

According to an aspect of the present disclosure, an information processing apparatus that communicates directly with an external apparatus using wireless communication includes a plurality of network interfaces, a storage unit configured to store a plurality of pieces of different network information respectively assigned to the plurality of network interfaces, an identification unit configured to identify a user who logged in the information apparatus, a selection unit configured to select, as network information to be transmitted directly to the external apparatus using the wireless communication, at least one network information corresponding to the identified user from among the stored plurality of pieces of network information, and a transmission unit configured to transmit the selected network information directly to the external apparatus using the wireless communication.

Further features will become apparent from the following description of exemplary embodiments with reference to the attached drawings.

BRIEF DESCRIPTION OF THE DRAWINGS

FIG. 2 illustrates an example of a configuration of the information processing apparatus.

FIG. 4 illustrates an example of a list in which a user identifier (ID), a network interface (IF) Gr, and an Internet Protocol (IP) address are associated.

FIG. 7 illustrates a detailed example of Bluetooth® LE communication.

FIGS. 8A and 8B are flowcharts illustrating an example of a series of processes from when a job is transmitted to an information processing apparatus including Bluetooth® LE until when the job is processed.

FIGS. 11A and 11B are flowcharts illustrating an example of a series of processes from when a job is transmitted to an information processing apparatus in which QR code display is installed until when the job is processed.

FIGS. 12A, 12B, 12C, and 12D are flowcharts illustrating an example of a series of processes including a writing process of IP addresses of a plurality of network interfaces (IFs) to a memory unit of an NFC unit.

DESCRIPTION OF THE EMBODIMENTS

Various exemplary embodiments of the present disclosure will be described in detail below with reference to the drawings. It should be noted that components described in the exemplary embodiments are mere examples and are not intended to limit the scope of the disclosure.

In each exemplary embodiment described below, an information processing apparatus that includes a plurality of network interfaces and is to be connected to a plurality of networks provides an external apparatus with network information that enables a user to connect the external apparatus to an appropriate network.

Figure 1:
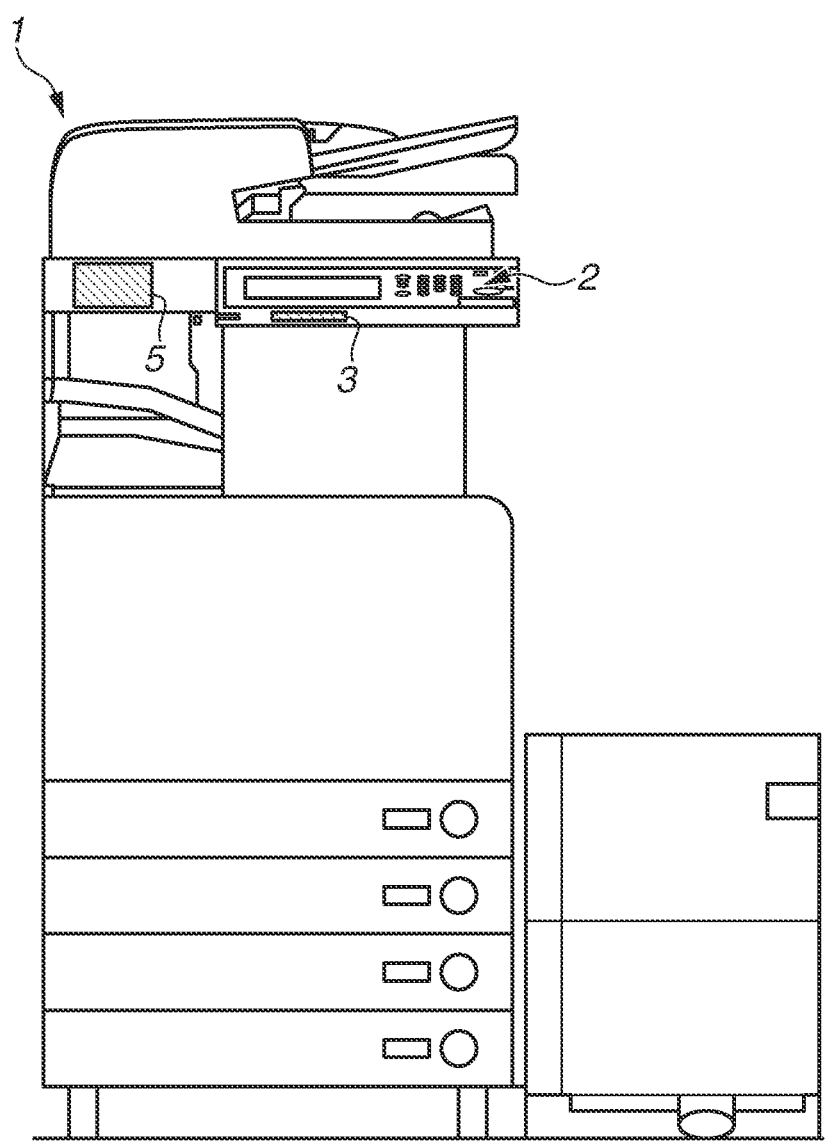
FIG. 1 illustrates an example of an information processing apparatus.

FIG. 1 illustrates an example of an information processing apparatus. An information processing apparatus 1 is, for example, a general multi-function peripheral that includes various functions such as a download function, a scan function, a facsimile function, and a print function. The information processing apparatus 1 includes an operation unit 2 configured to input a user operation instruction and a near field wireless unit 3 configured to enable communication with an external apparatus using near field wireless communication. The operation unit 2 can function as a display unit that displays information. In a first exemplary embodiment, a near field communication (NFC) unit 3 will be described as an example of the near field wireless unit.

The information processing apparatus 1 also includes an NFC reader/writer (R/W) unit 5. The user can log into the information processing apparatus 1 by holding an integrated circuit (IC) card with an NFC tag embedded therein, such as an employee identification card, over the NFC R/W unit 5.

FIG. 2 illustrates an example of the information processing apparatus. As illustrated in FIG. 2, the information processing apparatus 1 in the present exemplary embodiment includes a network interface (IF)_A 401 and a network IF_B 411. The information processing apparatus 1 can include two wire connection IFs, such as Ethernet®, two wireless connection IFs, or one wire connection IF and one wireless connection IF. While the case in which the information processing apparatus 1 includes two network IFs is described in the present exemplary embodiment, the information processing apparatus 1 can include three or more network IFs.

A unique identifier such as an Internet Protocol (IP) address or media access control (MAC) address is set to each network IF. For example, "172.24.1.100" is set to the network IF_A 401, and "172.24.1.200" is set to the network IF_B 411. The IP addresses can be IP addresses that are fixed or IP addresses that are assigned on the Dynamic Host Configuration Protocol (DHCP) server sides (403/413), etc.

The network IF_A 401 is connected to a controller 204 and is connected to a personal computer (PC) 402, a server 403, an access point 404, etc. via a network 405. The network IF_B 411 is connected to the controller 204 and is connected to a PC 412, a server 413, an access point 414, etc. via a network 415.

Dividing the networks using the plurality of network IFs as described above produces the following advantage. For example, in the cases in which one network is connected to a corporate local area network (LAN)_A of company A while another network is connected to a corporate LAN_B of company B, a user of one of the networks is prohibited from connecting to the other network to maintain security. It is also possible to limit the users allowed to connect to an access point of the network IFs using MAC address limitation, etc. when a user of one of the networks falsely acquires a service set identifier (SSID) of an access point or a password of the other network.

The NFC unit 3 includes an NFC antenna unit 301, an NFC control unit 302, and a memory unit 303. The information processing apparatus 1 can perform NFC communication 310 with a mobile terminal 100 via the NFC antenna unit 301. The above-described set IP address of the information processing apparatus 1 is stored in the memory unit 303 of the NFC unit 3 and rewritten by the NFC control unit 302. While the IP address is rewritten in the present exemplary embodiment, SSID, password, etc. can be written. As used herein, the term "password" refers to an encryption key.

While the case in which the NFC unit 3 for performing the NFC communication 310 is used for the communication between the information processing apparatus 1 and an external apparatus such as a mobile terminal is described as an example in the present exemplary embodiment, the present exemplary embodiment is not limited to the case. For example, an application to a case in which an information processing apparatus and an external device exchange information using near field wireless communication with Bluetooth® Low Energy (hereinafter, "Bluetooth® LE") is also possible. An application to a case in which an external device exchanges information with the information processing apparatus 1 by reading a Quick Response (QR) Code® displayed on the operation unit 2 of the information processing apparatus 1 is also possible.

The controller 204 including a central processing unit (CPU) 211 controls operations of the entire information processing apparatus 1. The CPU 211 reads a control program stored in a read-only memory (ROM) 212 in the controller 204 or a storage unit 207 to perform various types of control such as reading control and print control.

While one CPU 211 interprets a command developed onto a memory to execute a process illustrated in a flowchart described below in the information processing apparatus 1, any other form can be employed. For example, a plurality of processors, a plurality of random access memories (RAMs) 213, the ROM 212, and a storage can cooperate to execute a process illustrated in a flowchart described below. A hardware circuit can be used to execute part of the process. The control of a module such as the NFC unit 3 is realized by cooperation with a processor, etc. of the module.

A CPU 203 of the operation unit 2 controls a key panel 202, a liquid crystal display (LCD) panel 201, and the NFC control unit 302 and the memory unit 303 of the NFC unit 3. The CPU 203 is controlled by the controller 204. A reader 205 and a printer 206 are controlled by the CPU 211 in the controller 204. The memory unit 303 stores network information, etc. (e.g., an IP address, a SSID, and a password of an access point on a network) such as the IP address of the information processing apparatus 1.

Figure 13:
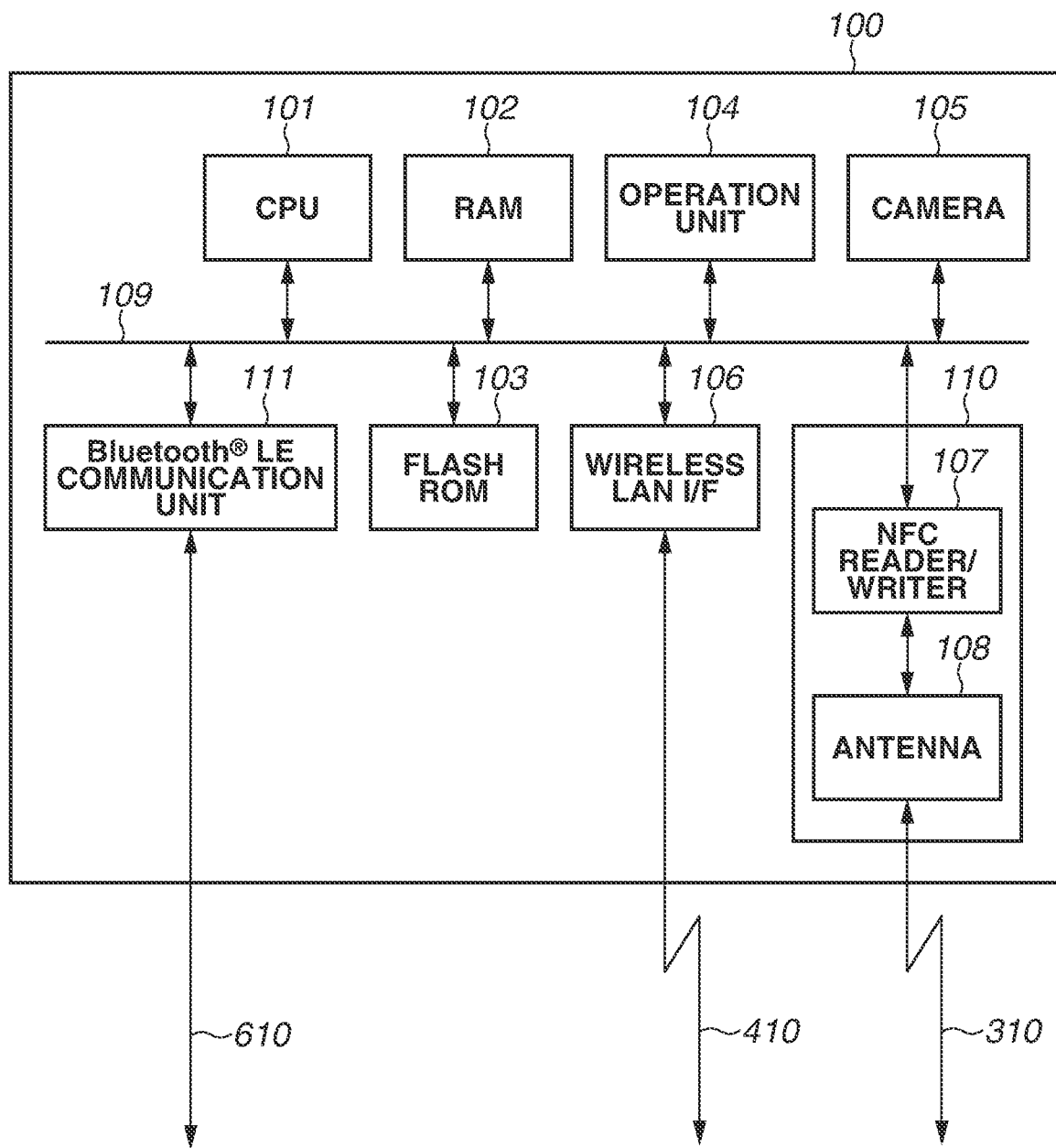
FIG. 13 illustrates an example of the configuration of the mobile terminal.

FIG. 13 illustrates an example of a configuration of the mobile terminal 100. A CPU 101 is a central processing unit configured to control the entire mobile terminal 100. A RAM 102 is a work memory to temporarily store data for use in computation by the CPU 101. A flash ROM 103 stores a program and various types of data for use by the CPU 101. An operation unit 104 is to input and output information between a user and the mobile terminal 100, and includes a LCD and touch panel.

A camera 105 is an image capturing unit configured to capture still and moving images. A wireless LAN interface (I/F) 106 is an interface for exchanging data with an external device via wireless LAN communication 410.

An NFC communication unit 110 includes an NFC reader/writer 107 and an antenna 108. The NFC reader/writer 107 performs control for performing the NFC communication 310. The antenna 108 is an antenna for performing the NFC communication 310, and exchanges a radio wave generated by the NFC communication 310 with the external device.

A Bluetooth® LE communication unit 111 performs control for performing Bluetooth® Low Energy communication 610 with an external device, and exchanges a radio wave generated by the Bluetooth® LE communication 610. The CPU 101, the RAM 102, the flash ROM 103, the operation unit 104, the camera 105, the wireless LAN I/F 106, and the NFC reader/writer 107 are connected via a system bus 109 to exchange data with one another.

If the NFC reader/writer 107 of the mobile terminal 100 performing a reader/writer operation is held over the NFC antenna unit 301 of the NFC unit 3 of the information processing apparatus 1, the NFC reader/writer 107 reads information stored in the memory unit 303 of the NFC unit 3. The information to be read at this time is network information for the wireless LAN communication 410, and examples include an IP address, an SSID, a password, and a device name.

The mobile terminal 100 connects to the information processing apparatus 1 using the read network information using the wireless LAN communication 410 via the access point 404 or 414. The mobile terminal 100 connects to the information processing apparatus 1 through the above-described process to transmit a job to the information processing apparatus 1, receive data read by the information processing apparatus 1, etc.

As used herein, the term "job" refers to a print job, a scan job, etc. The print job is data that stores an instruction to cause the information processing apparatus 1 to execute print processing, image data, setting information, etc. The scan job is data that stores an instruction to cause the information processing apparatus 1 to execute scan processing and setting information.

The mobile terminal 100 can use the network 405 or 415 via the access point 404 or 414.

To perform wireless LAN communication based on communication standards, the user needs to set the network information via the operation unit 104 of the mobile terminal 100, which is inconvenient for the user. To overcome this inconvenience, a handover method is widely used in which, when a mobile terminal and an information processing apparatus are to perform wireless LAN communication, first the mobile terminal reads an NFC tag to acquire necessary network information for wireless LAN connection and then the wireless LAN connection is performed based on the acquired network information.

The information processing apparatus 1 is required to include an NFC R/W besides the NFC unit 3 in order to realize user authentication and login with an IC card 511.

The NFC R/W unit 5 acquires user authentication information from the IC card 511 under the control by the controller 204. While the example in which the user authentication information is acquired from the IC card 511 by holding the IC card 511 including the NFC tag over the NFC R/W unit 5 is described in the present exemplary embodiment, the present exemplary embodiment is not limited to the example.

For example, the information processing apparatus 1 can acquire user authentication information by displaying a login screen on the operation unit 2 to prompt the user to input the user authentication information such as a user identifier (ID) and a password via the login screen. In this case, the CPU 211 determines whether to allow the user to log in by comparing the user authentication information input via the login screen with the user authentication information stored on the server 403 or 413, or in the storage unit 207 of the information processing apparatus 1.

Figure 3A:
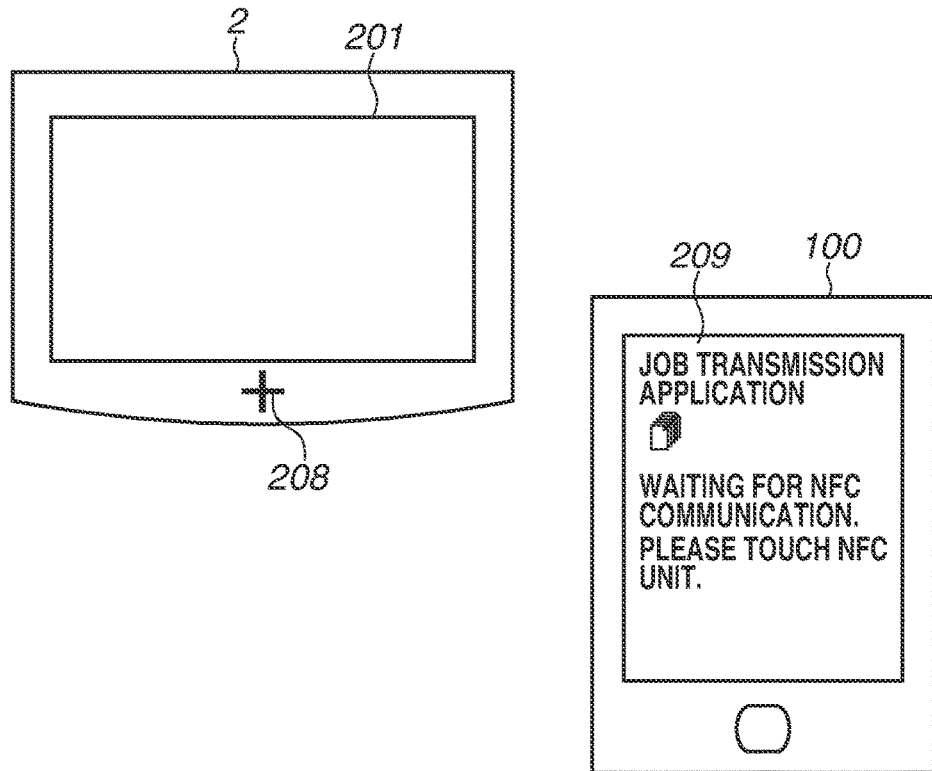
FIGS. 3A and 3B illustrate an example of a configuration at the time when a mobile terminal is held over a near field communication (NFC) unit of the information processing apparatus.
Figure 3B:
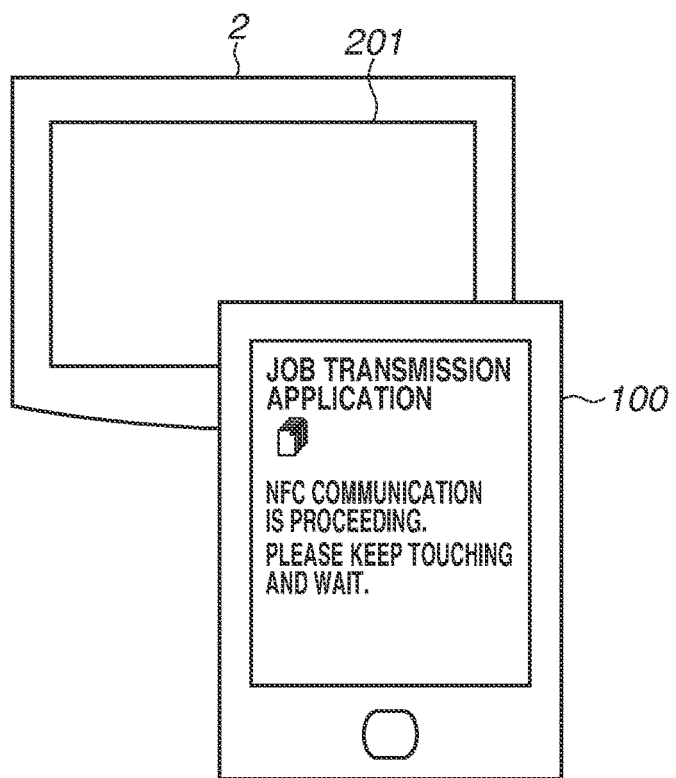

FIGS. 3A and 3B illustrate an example of a configuration at the time of holding the mobile terminal 100 over the NFC unit 3 of the information processing apparatus 1. A mark 208 indicating the NFC antenna unit 301 is provided under the LCD panel 201 of the operation unit 2. The user instructs to activate a job transmission application 209 for transmitting a print job, a scan job, etc. from the mobile terminal 100 to the information processing apparatus 1 on the mobile terminal 100.

If the mobile terminal 100 detects a user instruction to activate the job transmission application 209, the mobile terminal 100 displays a screen of the job transmission application 209 installed in the mobile terminal 100.

The job transmission application 209 displays information, such as "Waiting for NFC communication. Please touch NFC unit.", on the operation unit 2 of the mobile terminal 100, as illustrated in FIG. 3A.

If the mobile terminal 100 is held over the mark 208 indicating NFC, the NFC control unit 302 of the information processing apparatus 1 detects a radio wave of the NFC communication 310 of the mobile terminal 100 via the NFC antenna unit 301. Then, the NFC control unit 302 acquires network information, such as the IP address of the information processing apparatus 1, from the detected radio wave of the NFC communication 310.

At this time, the job transmission application 209 displays information, such as "NFC communication is proceeding. Please keep touching and wait.", on the screen of the mobile terminal 100, as illustrated in FIG. 3B. If the acquisition of information from the information processing apparatus 1 via the NFC communication 310 is completed, the mobile terminal 100 becomes enabled to perform the wireless LAN communication 410 with the information processing apparatus 1 based on the network information such as the IP address of the information processing apparatus 1. If the wireless LAN communication 410 with the information processing apparatus 1 is enabled, the job transmission application 209 becomes enabled to transmit print data, etc. to the information processing apparatus 1.

FIG. 4 illustrates an example of a list in which a user ID, a network IF Gr, and an IP address are associated.

A list 501 includes items of the following information; a user ID 502 for identifying a user, a network IF Gr 503 using a network IF that the user is allowed to use, an IP address 504, an access point SSID 505 of an access point connected to the network IF, and an access point password 506.

The list 501 is stored in the storage unit 207 of the information processing apparatus 1. The list 501 is registered in advance by an administrator and can be changeable via the operation unit 2 or from an external PC. While the user ID, the network IF Gr, and the network information are associated in the present exemplary embodiment, the association is not limited to the above-described association, and each user ID can be associated with network information.

The information processing apparatus 1 refers to the list 501 illustrated in FIG. 4 and determines the network information to be written to the memory unit 303 of the NFC unit 3 at the time of user login.

The network IF_A 401 (IP address "172.24.1.100") is connected to the access point 404. Thus, the SSID "ABC" and the password "1111" are assigned to the network IF_A 401.

The network IF_B 411 (IP address "172.24.1.200") is connected to the access point 414. Thus, the SSID "DEF" and the password "2222" are assigned to the network IF_B 411. The following describes an example in which the user holding the IC card 511 storing the user ID "3" logs in using the IC card 511 in FIG. 2.

The user holds the IC card 511, such as an employee identification card, over the NFC R/W unit 5 of the information processing apparatus 1 to attempt to log in. The information processing apparatus 1 allows the user associated with the user ID "3" to log in based on the user ID "3" acquired by reading the IC card 511.

The information processing apparatus 1 acquires the network information corresponding to the user ID "3" read from the IC card 511 at the time of login based on the list 501. The network information at this time is "172.24.1.200" of the IP address, "DEF" of the access point SSID, and "2222" of the access point password.

The information processing apparatus 1 writes the network information to the memory unit 303 of the NFC unit 3. Then, if the user holds the mobile terminal 100 over the NFC unit 3 as illustrated in FIGS. 3A and 3B, the NFC control unit 302 performs the NFC communication 310 with the mobile terminal 100 via the NFC antenna unit 301.

The mobile terminal 100 acquires, via the NFC communication 310, the network information about the network IF_B 411 of the information processing apparatus 1 that is stored in the memory unit 303 of the information processing apparatus 1. The network information is "172.24.1.200" of the IP address, "DEF" of the access point SSID, and "2222" of the access point password.

The mobile terminal 100 performs the wireless LAN communication 410 via the access point 404, and transmits a job to the IP address "172.24.1.200" of the network IF_B 411 of the information processing apparatus 1 that is acquired via the NFC communication 310.

As described above, the user uses the mobile terminal 100 to perform NFC communication with the information processing apparatus 1 which includes a plurality of network IFs and in which the use of each network IF is limited to a user allowed to use the network IF. In this way, the mobile terminal 100 receives network information about the network IF that the user is allowed to use, whereby the mobile terminal 100 and the information processing apparatus 1 can perform wireless LAN communication.

A detailed control method for rewriting network information for use in mobile cooperation, which is described above with reference to FIG. 4, will be described below with reference to flowcharts in FIGS. 5A, 5B, 5C, and 5D. FIGS. 5A to 5D are the flowcharts illustrating an example of a series of processes from when a job is transmitted to the information processing apparatus 1 including NFC until when the job is processed. The CPU 211 or 203 reads a program stored in the ROM 212 and executes the program to realize the flowcharts in FIGS. 5A to 5C.

Figure 5A:
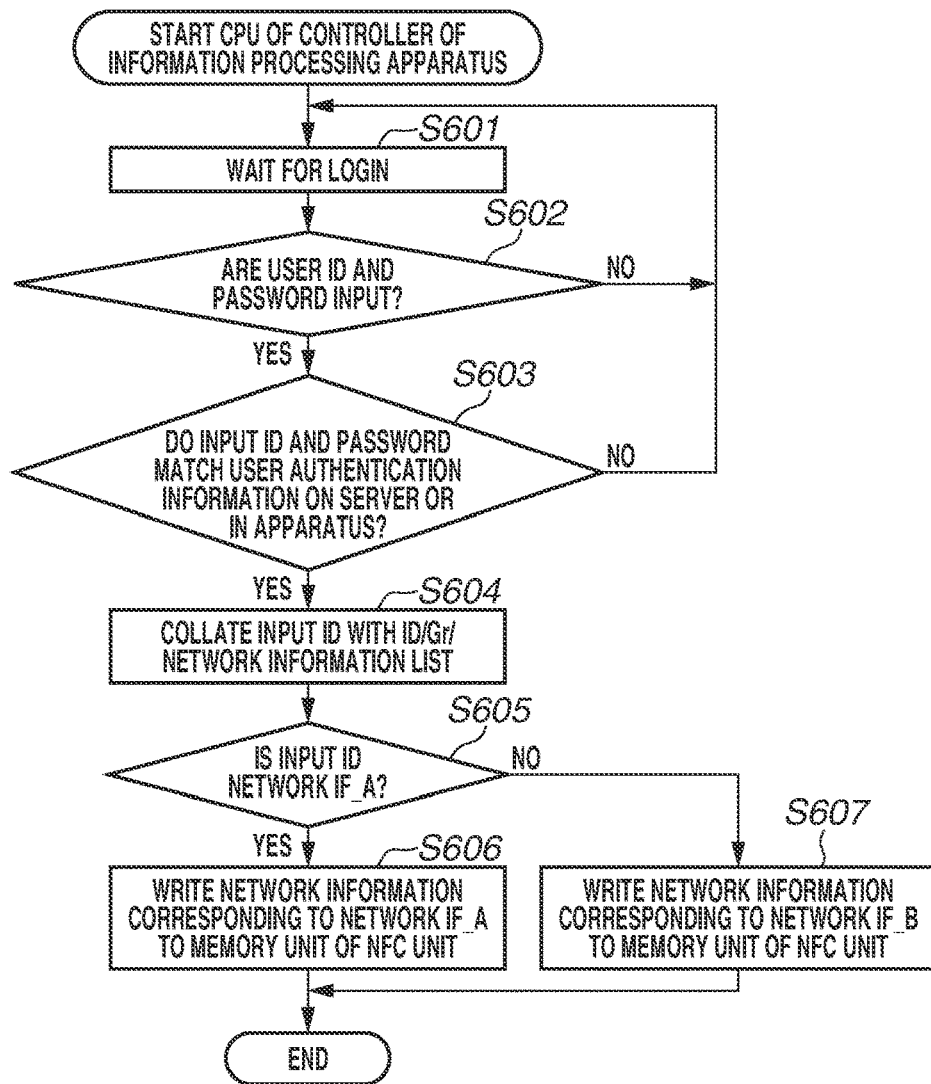
FIGS. 5A, 5B, 5C, and 5D are flowcharts illustrating an example of a series of processes from when a job is transmitted to an information processing apparatus including NFC until when the job is processed.

FIG. 5A illustrates a process performed by the CPU 211 in the controller 204 of the information processing apparatus 1 in the series of processes from when a job is transmitted to the information processing apparatus 1 including NFC until when the job is processed.

In step S601, the CPU 211 displays a login screen (not illustrated) on the operation unit 2 and waits for a login instruction from a user. The CPU 211 can also wait for a login instruction from the IC card 511.

In step S602, the CPU 211 determines whether a login instruction is input. Specifically, in a case where authentication information (a user ID and a password) is received and then a login operation is performed via the login screen (not illustrated), the CPU 211 determines that a login instruction is input.

The CPU 211 also determines that a login instruction is input in a case where the NFC R/W unit 5 detects that the IC card 511 is held over the NFC R/W unit 5 and user identification information is received. In a case where the CPU 211 determines that a login instruction is input (YES in step S602), the processing proceeds to step S603. In a case where a login key is not pressed or in a case where the NFC R/W unit 5 does not detect that the IC card 511 is held over the NFC R/W unit 5 (NO in step S602), the CPU 211 determines that no login instruction is input, and waits for a login instruction.

In step S603, the CPU 211 performs user authentication processing and login processing based on the authentication information. In the case in which the login instruction is input using the IC card 511 in step S602, the CPU 211 acquires user identification information as authentication information from the IC card 511 detected in step S602. The user identification information can be, for example, a user ID, a card number associated with the user ID on a database server (not illustrated), etc. In the present exemplary embodiment, the user ID is described as the user identification information.

In step S602, in a case where the login instruction is input by a user operation via the login screen, the user ID and the password input via a screen 420 are acquired as authentication information.

The CPU 211 compares the acquired authentication information with information in a user database (DB) stored in the server or in the apparatus. As a result of the comparison, in a case where the CPU 211 determines to allow login (YES in step S603), the CPU 211 performs login processing to log the user into the information processing apparatus 1, and the processing proceeds to step S604. In a case where the CPU 211 determines not to allow the user to log in (NO in step S603), the CPU 211 displays a message indicating that the attempt to log in fails, and the processing returns to step S601.

In the case in which the login instruction is input using the IC card 511, the CPU 211 searches the user DB using the user ID acquired from the IC card 511 in step S602 as a search key. As a result of the search, in a case where there is a user of the same user ID in the user DB, the CPU 211 allows the user to log in, whereas in a case where there is no user of the same user ID, the CPU 211 does not allow the use to log in.

In step S604, the CPU 211 compares the user ID of the user allowed to log in by the processing in step S603 with the list 501.

In step S605, the CPU 211 determines the network IF Gr to be used by the user from among the plurality of network IF Grs. For example, in the case of the user of the user ID "3", the network IF Gr is "network IF_B-Gr" (NO in step S605), and the processing proceeds to step S607. In a case where the network IF Gr is "network IF_A-Gr" (YES in step S605), the processing proceeds to step S606.

In step S606, since the IF to be used by the user is "network IF_A-Gr", the CPU 203 of the operation unit 2 refers to the list 501 and writes the network information corresponding to the network IF_A-Gr to the memory unit 303 of the NFC unit 3. The network information is "172.24.1.100" of the IP address, "ABC" of the access point SSID, and "1111" of the access point password.

In step S607, since the IF to be used by the user is "network IF_B-Gr", the CPU 203 of the operation unit 2 refers to the list 501 and writes the network information corresponding to the network IF_B-Gr to the memory unit 303 of the NFC unit 3. The network information at this time is "172.24.1.200" of the IP address, "DEF" of the access point SSID, and "2222" of the access point password.

Figure 5B:
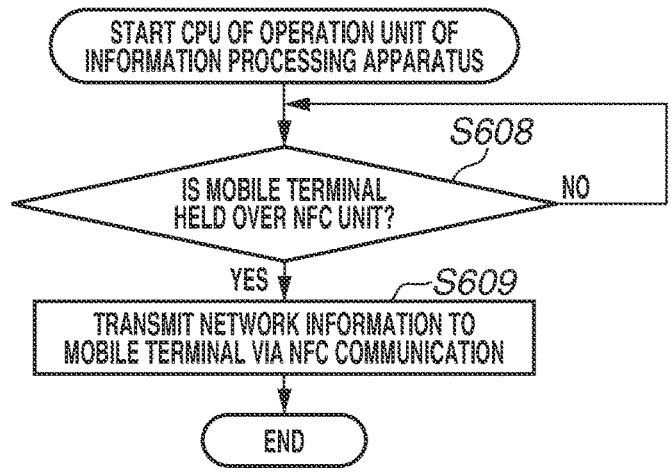

FIG. 5B illustrates a process performed by the CPU 203 of the operation unit 2 in the series of processes from when a job is transmitted to the information processing apparatus 1 including NFC until when the job is processed.

In step S608, the CPU 203 of the operation unit 2 determines whether the NFC communication unit 110 of the mobile terminal 100 is held over the NFC unit 3 in the NFC communication 310. In a case where the CPU 203 determines that the NFC communication unit 110 is held over the NFC unit 3 (YES in step S608), the processing proceeds to step S609.

In step S609, the CPU 203 of the operation unit 2 transmits the network information described above to the CPU 101 of the mobile terminal 100 in the NFC communication 310.

Figure 5C:
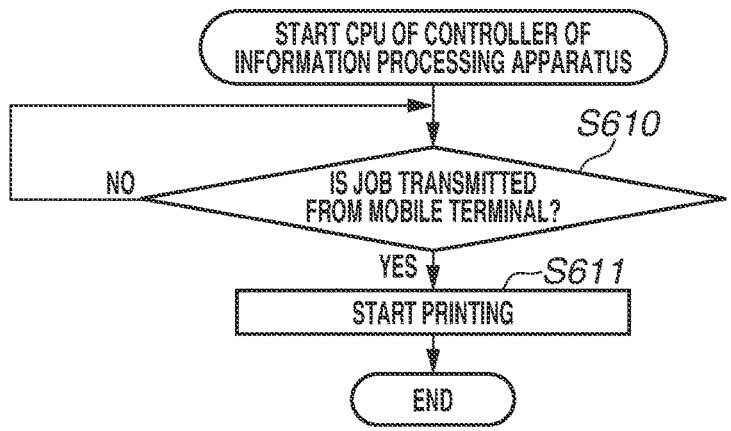

FIG. 5C illustrates a process performed by the CPU 211 of the information processing apparatus 1 in the series of processes from when a job is transmitted to the information processing apparatus 1 including NFC until when the job is processed.

In step S610, the CPU 211 determines whether a job is received from the CPU 101 of the mobile terminal 100. In a case where the CPU 211 determines that a job is received from the CPU 101 (YES in step S610), the processing proceeds to step S611. In step S611, the CPU 211 controls the printer 206 to start printing the received job.

Figure 5D:
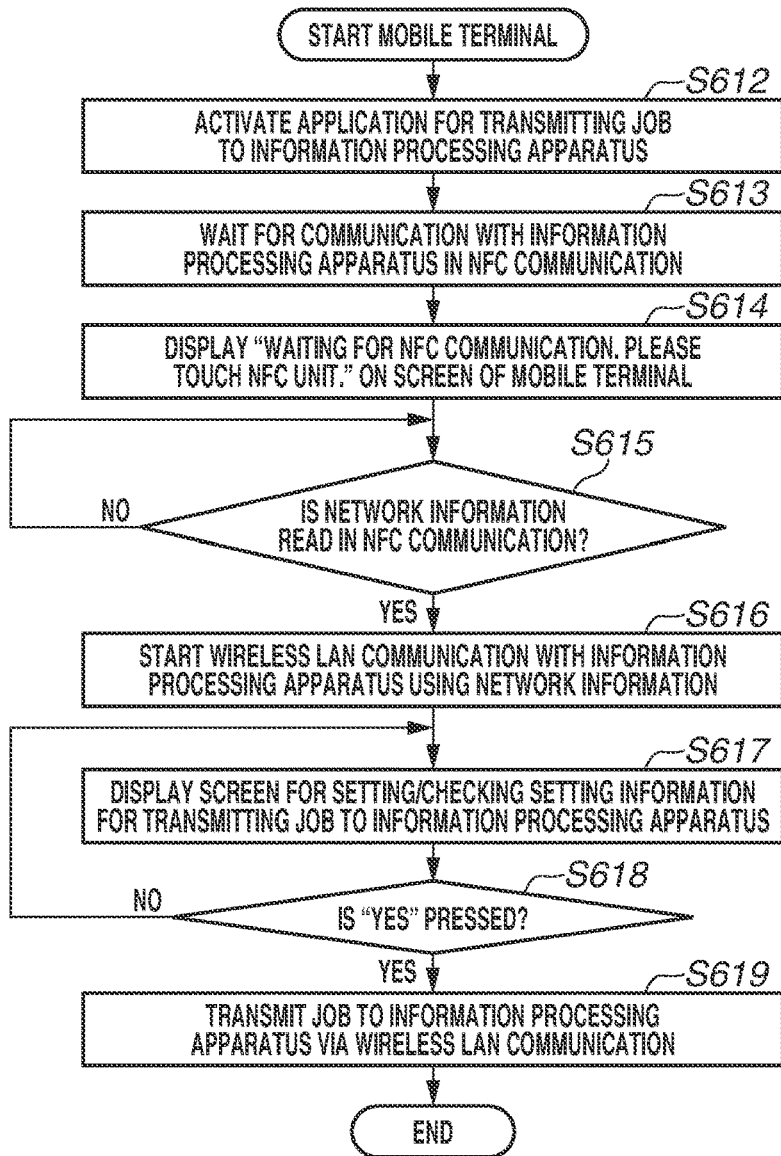

FIG. 5D illustrates a process performed by the mobile terminal 100. In step S612, the CPU 101 of the mobile terminal 100 activates a job transmission application 209 for transmitting a job to the information processing apparatus 1. In step S613, the mobile terminal 100 waits for communication with the information processing apparatus 1 in the NFC communication 310. In step S614, the CPU 101 of the mobile terminal 100 displays, for example, a message "Waiting for NFC communication. Please touch NFC unit." on the operation unit 104 of the mobile terminal 100.

In step S615, the CPU 101 of the mobile terminal 100 determines whether network information about the network IF is acquired (or read) in the NFC communication 310. In a case where the CPU 101 determines that the network information is acquired (YES in step S615), the processing proceeds to step S616.

In step S616, the CPU 101 of the mobile terminal 100 connects to the information processing apparatus 1 via an access point in the wireless LAN communication 410 using the acquired network information.

In step S617, the CPU 101 of the mobile terminal 100 displays a screen (not illustrated) for setting and checking setting information for transmitting a job to the information processing apparatus 1. Examples of setting information include color/monochrome settings and stapling-on/off settings.

In step S618, the CPU 101 of the mobile terminal 100 determines whether "YES" is pressed or "NO" is pressed on the screen for setting and checking as described above. In a case where the CPU 101 determines that "NO" is pressed (NO in step S618), the processing returns to step S617. In a case where the CPU 101 determines that "YES" is pressed (YES in step S618), the processing proceeds to step S619, and the CPU 101 of the mobile terminal 100 transmits a job to the network IF of the information processing apparatus 1 using the acquired network information.

In the case in which a user allowed to connect to a plurality of networks logs in, the user can be prompted to select a network to connect and the network information about the selected network can be stored in the memory unit 303 of the NFC unit 3.

In the present exemplary embodiment, the information processing apparatus 1 including a plurality of network interfaces can prevent transmission of network information about a network that the use by the user is limited, to an external apparatus, by performing handover.

In the first exemplary embodiment described above, the example is described in which the information processing apparatus 1 transmits the network information in the NFC communication 310 via the NFC unit 3. In a second exemplary embodiment, an example will be described below in which the information processing apparatus 1 transmits network information in the Bluetooth® LE communication 610 via a Bluetooth® Low Energy unit 6, which is mainly the difference from the first exemplary embodiment.

The Bluetooth® LE unit 6 includes a Bluetooth® LE antenna unit 601, a Bluetooth® LE control unit 602, and a memory unit 603.

Figure 6:
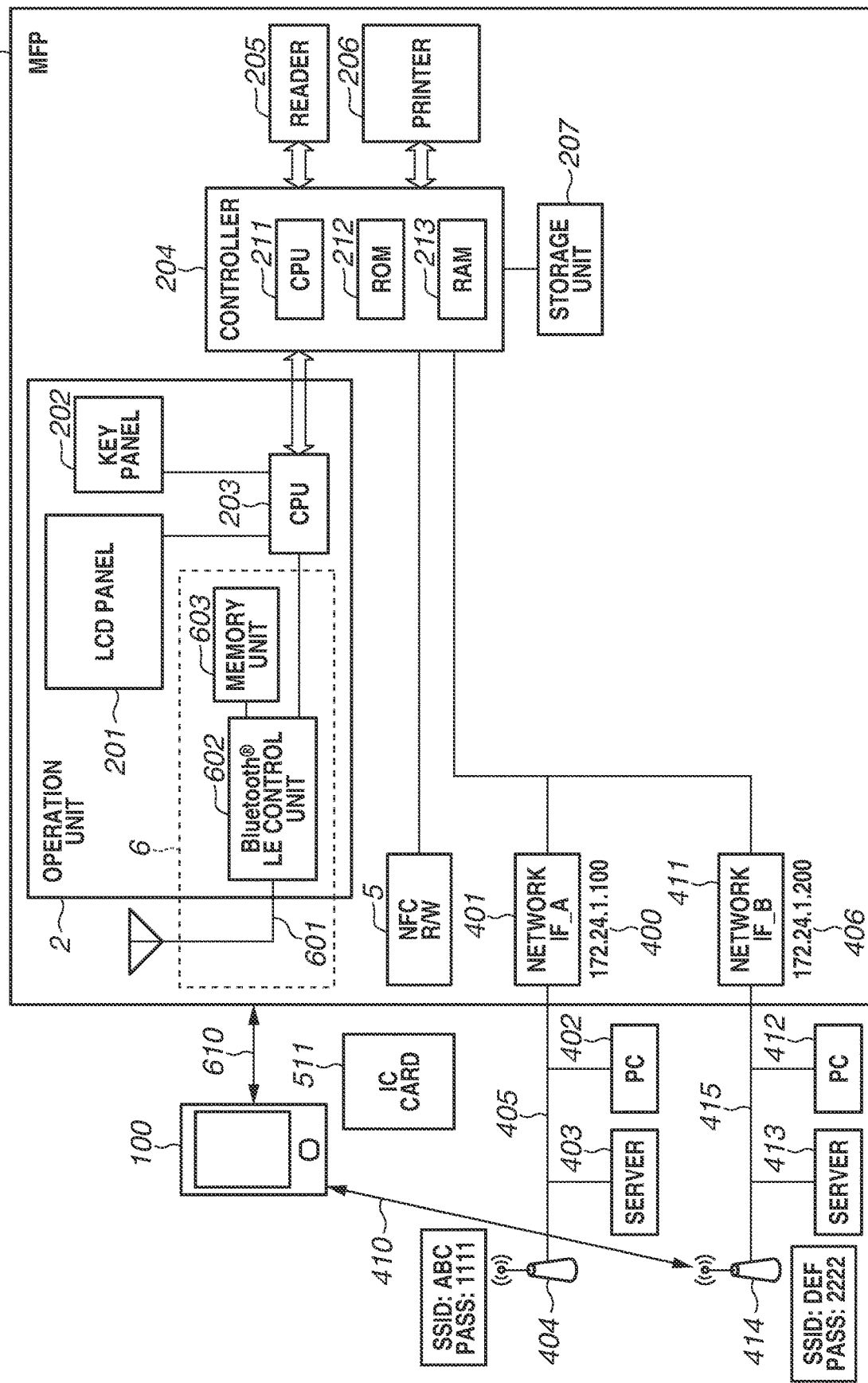
FIG. 6 illustrates an example of the configuration of an information processing apparatus including Bluetooth® low energy (LE).

FIG. 6 illustrates an example of a configuration of the information processing apparatus 1 including Bluetooth® LE.

The storage unit 207 of the information processing apparatus 1 stores the list 501 illustrated in FIG. 4 in which the user ID, the network IF Gr, and the network information are associated. A user holds the IC card 511 such as an employee identification card including an NFC tag over the NFC R/W unit 5 so that the CPU 211 of the information processing apparatus 1 acquires user identification information and performs login processing. The user identification information can be, for example, a user ID, a card number associated with the user ID on the database server (not illustrated), etc. In the present exemplary embodiment, the user ID is described as the user identification information.

The CPU 211 acquires the network information corresponding to the user ID "3" read from the IC card 511 at the time of login based on the list 501. The network information at this time is "172.24.1.200" of the IP address, "DEF" of the access point SSID, and "2222" of the access point password. The CPU 211 writes the acquired network information to the memory unit 603 of the Bluetooth® LE unit 6.

FIG. 7 illustrates an example of detailed Bluetooth® LE communication. The following schematically illustrates general operations performed by the mobile terminal 100 to perform the Bluetooth® LE communication 610 with the information processing apparatus 1 and perform handover to the wireless LAN communication 410.

The information processing apparatus 1 periodically transmits a Bluetooth® LE beacon 701. Information such as the network information (an IP address, an access point SSID, an access point password) about the information processing apparatus 1 can be included in the transmission packet of the Bluetooth® LE beacon 701 and transmitted. The mobile terminal 100 receives the Bluetooth® LE beacon 701 and acquires the network information about the information processing apparatus 1.

The information processing apparatus 1 transmits the network information written to the memory unit 603 to the Bluetooth® LE communication unit 111 of the mobile terminal 100 using the Bluetooth® LE beacon 701. The network information at this time is "172.24.1.200" of the IP address, "DEF" of the access point SSID, and "2222" of the access point password.

In this way, the mobile terminal 100 performs the wireless LAN communication 410 via the access point 404 to transmit a job to the network IF_B 411 of the information processing apparatus 1 that is acquired from the Bluetooth® LE beacon 701.

Figure 8A:
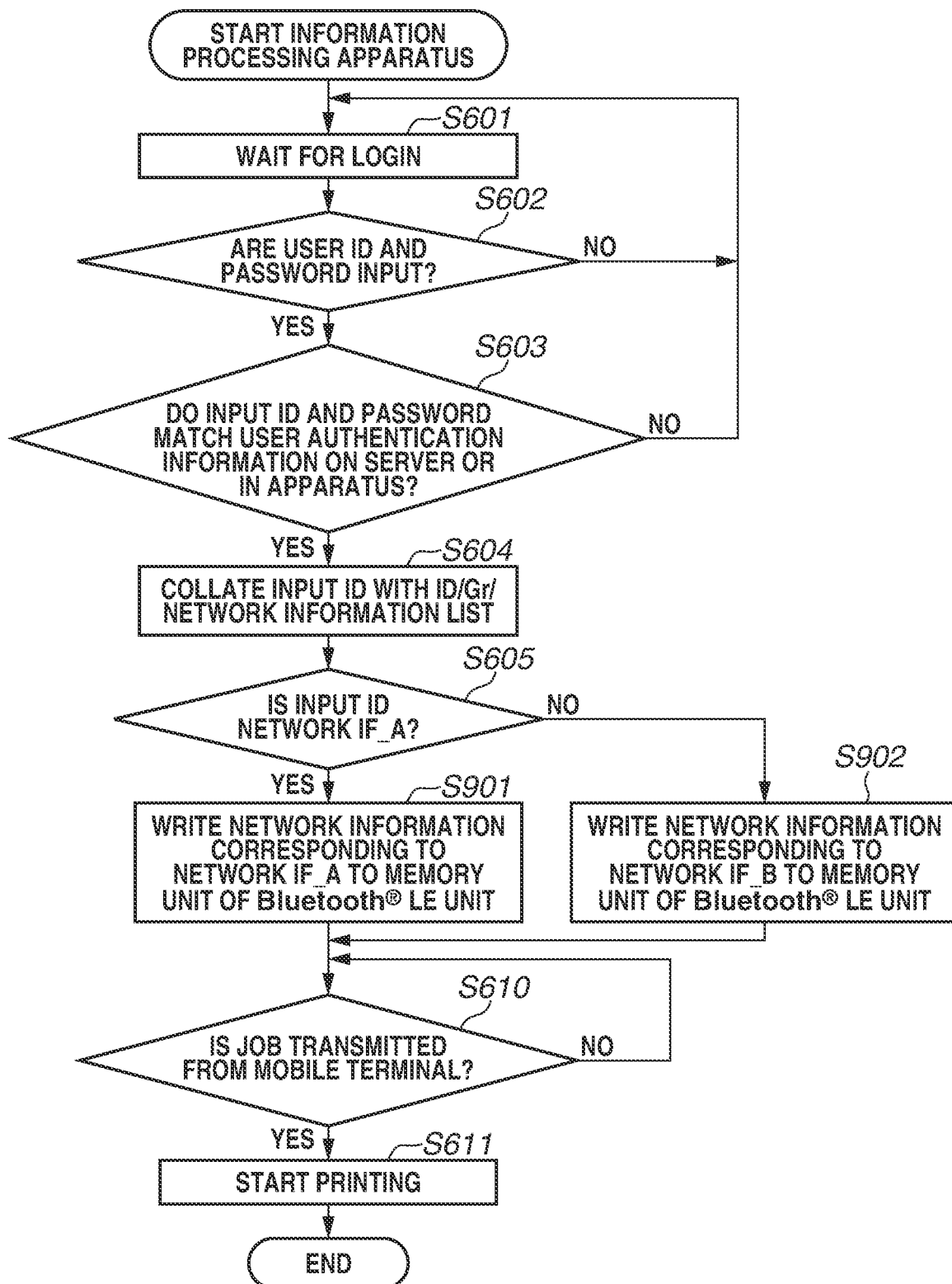

FIGS. 8A and 8B are flowcharts illustrating an example of a series of processes from when a job is transmitted to the information processing apparatus 1 including Bluetooth® LE until when the job is processed. The CPU 211 or 203 reads a program stored in the ROM 212 and executes the program to execute the flowcharts in FIGS. 8A and 8B. The following describes the differences from the process performed by the information processing apparatus 1 including the NFC unit 3 in the first exemplary embodiment.

FIG. 8A illustrates a process performed by the CPU 211 in the controller 204 of the information processing apparatus 1 in the series of processes from when a job is transmitted to the information processing apparatus 1 including Bluetooth® LE until when the job is processed.

In step S601, the CPU 211 displays the login screen (not illustrated) on the operation unit 2 and waits for a login instruction from the user. The CPU 211 can also wait for a login instruction from the IC card 511.

The CPU 211 can instruct the CPU 203 to stop transmitting the Bluetooth® LE beacon 701 or to transmit the Bluetooth® LE beacon 701 until a login instruction is received. The content of the Bluetooth® LE beacon 701 before the user logs in can be a beacon indicating the state of waiting for login.

In step S604, the CPU 211 compares the user ID of the user allowed to log in by the processing in step S603 with the list 501.

In step S605, the CPU 211 determines a network IF Gr to be used by the user from among the plurality of network IFs Gr. For example, in the case of the user of the user ID "3", the network IF Gr is "B" (NO in step S605), and the processing proceeds to step S902. In a case where the network IF Gr is "A" (YES in step S605), the processing proceeds to step S901.

In step S901, since the IF to be used by the user is "A", the CPU 203 of the operation unit 2 refers to the list 501 and writes the network information corresponding to the network IF_A-Gr to the memory unit 603 of the Bluetooth® LE unit 6. The network information at this time is "172.24.1.100" of the IP address, "ABC" of the access point SSID, and "1111" of the access point password.

In step S902, since the IF to be used by the user is "B", the CPU 203 of the operation unit 2 refers to the list 501 and writes the network information corresponding to the network IF_B-Gr to the memory unit 603 of the Bluetooth® LE unit 6. The network information at this time is "172.24.1.200" of the IP address, "DEF" of the access point SSID, and "2222" of the access point password. Steps S610 and S611 are the same as in FIG. 5C described above, and thus their description is omitted herein.

If the network information is written to the memory unit 603 of the Bluetooth® LE unit 6, the CPU 203 of the operation unit 2 transmits the network information using the Bluetooth® LE beacon 701 via the Bluetooth® LE unit 6.

If the CPU 203 of the operation unit 2 receives a job, the transmission of the Bluetooth® LE beacon 701 can be stopped.

The following describes a process performed by the mobile terminal 100, with reference to FIG. 8B.

In step S612, the CPU 101 of the mobile terminal 100 activates the job transmission application 209 for transmitting a job to the information processing apparatus 1.

In step S903, the CPU 101 of the mobile terminal 100 waits until the Bluetooth® LE beacon 701 is received from the information processing apparatus 1.

In step S904, the CPU 101 of the mobile terminal 100 determines whether the network information of the Bluetooth® LE beacon 701 from the information processing apparatus 1 is read. In a case where the network information is read (YES in step S904), the processing proceeds to step S616.

In step S616, the CPU 101 of the mobile terminal 100 connects to the information processing apparatus 1 via an access point in the wireless LAN communication 410 using the acquired network information.

In step S617, the CPU 101 of the mobile terminal 100 displays a screen (not illustrated) for setting and checking setting information for transmitting a job to the information processing apparatus 1. Examples of setting information include color/monochrome settings and stapling-on/off settings.

In step S618, the CPU 101 of the mobile terminal 100 determines whether "YES" is pressed or "NO" is pressed on the screen for setting and checking as described above. In a case where the CPU 101 determines that "NO" is pressed (NO in step S618), the processing returns to step S617.

In a case where the CPU 101 determines that "YES" is pressed (YES in step S618), the processing proceeds to step S619, and the CPU 101 of the mobile terminal 100 transmits a job to the information processing apparatus 1.

The present exemplary embodiment produces a similar advantage to that produced by the first exemplary embodiment in the case of using a mobile terminal that does not include an NFC communication unit.

In the first exemplary embodiment described above, the example is described in which the information processing apparatus 1 transmits the network information in the NFC communication 310 via the NFC unit 3. In the second exemplary embodiment described above, the example is described which the information processing apparatus 1 transmits network information in the Bluetooth® LE communication 610 via a Bluetooth® Low Energy unit 6. In a third exemplary embodiment, an example will be described below in which the information processing apparatus 1 displays network information using a QR Code® 803, which is mainly the difference from the first and second exemplary embodiments.

Figure 9:
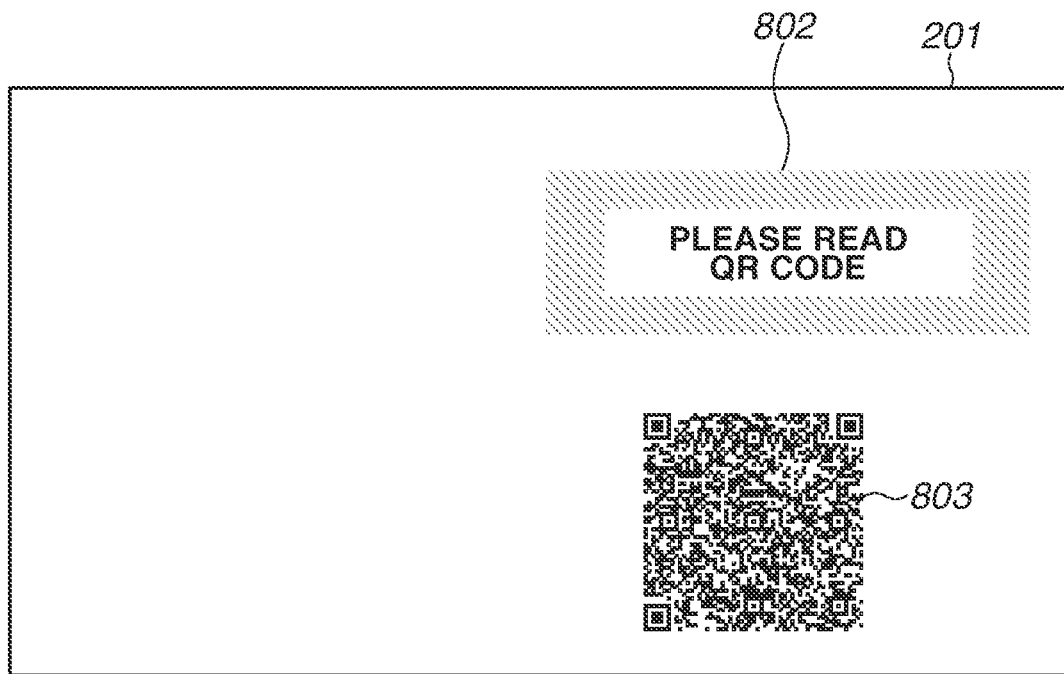
FIG. 9 illustrates an example of the configuration of an information processing apparatus in which a Quick Response (QR) Code® display is installed.

FIG. 9 illustrates an example of a configuration of the information processing apparatus 1 including QR Code® display.

The storage unit 207 of the information processing apparatus 1 stores the list 501 illustrated in FIG. 4 in which the user ID, the network IF Gr, and the network information are associated. The user holds the IC card 511 such as an employee identification card including an NFC tag over the NFC R/W unit 5 so that the CPU 211 of the information processing apparatus 1 acquires user identification information and performs login processing. The user identification information can be, for example, a user ID, a card number associated with the user ID on the database server (not illustrated), etc. In the present exemplary embodiment, the user ID is described as the user identification information.

The CPU 211 reads the network information corresponding to the user ID "3" read from the IC card 511 at the time of login based on the list 501. The network information at this time is "172.24.1.200" of the IP address, "DEF" of the access point SSID, and "2222" of the access point password.

If an icon (not illustrated) for starting communication with the mobile terminal 100 that is displayed on the LCD panel 201 is pressed, the CPU 211 displays the corresponding network information as the QR Code® 803 in FIG. 9 on the LCD panel 201. A QR Code® is an example of a two-dimensional code representing information as a graphical pattern. While the use of the QR Code® 803 to display the network information is described as an example in the present exemplary embodiment, the display of network information is not limited to the above-described example. For example, a one-dimensional barcode, etc. can be used.

Figure 10:
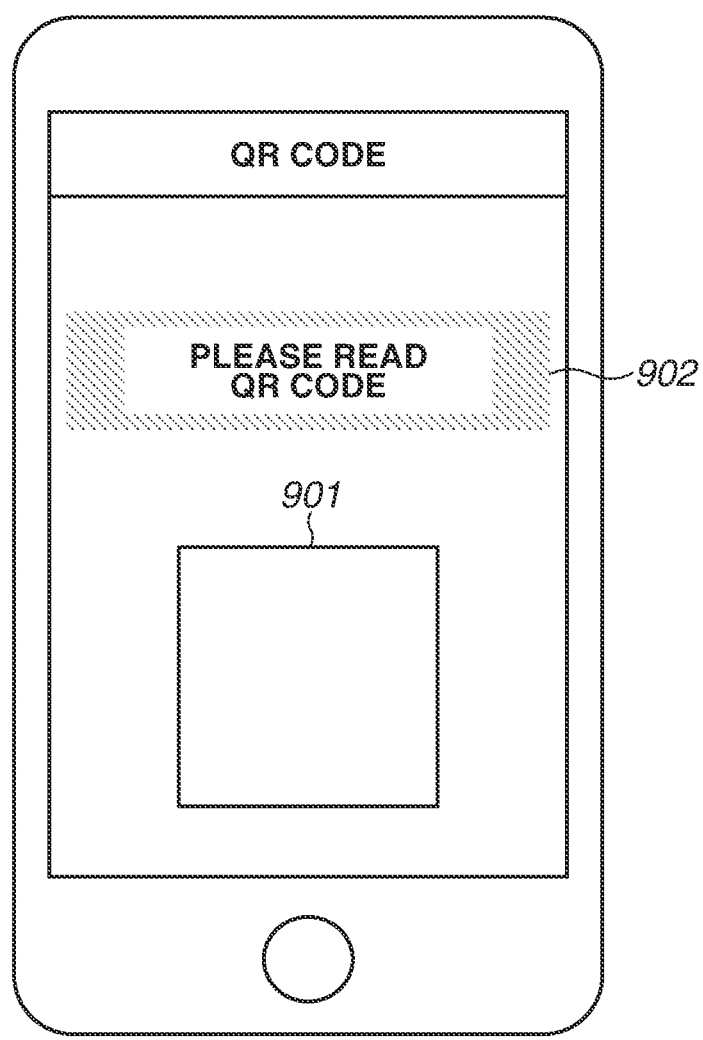
FIG. 10 illustrates an example of a display screen of a mobile terminal that reads a QR code.

FIG. 10 illustrates an example of a display screen of the mobile terminal 100 that reads a QR Code®. A display 901 is an image capturing area for capturing an image of a QR Code® when the user reads the QR Code®. A message 902 is a message that instructs the user to read the QR Code® 803 displayed on the LCD panel 201 using the mobile terminal 100.

The QR Code® 803 displayed on the LCD panel 201 is read by the camera 105 of the mobile terminal 100. Then, the mobile terminal 100 acquires the network information about the network IF_B 411 of the information processing apparatus 1 from the read QR Code® 803. The network information at this time is "172.24.1.200" of the IP address, "DEF" of the access point SSID, and "2222" of the access point password.

The mobile terminal 100 performs the wireless LAN communication 410 via the access point 404 using the network information acquired from the QR Code® 803 so that the mobile terminal 100 can transmit a job to the network IF_B 411 of the information processing apparatus 1.

Figure 11A:
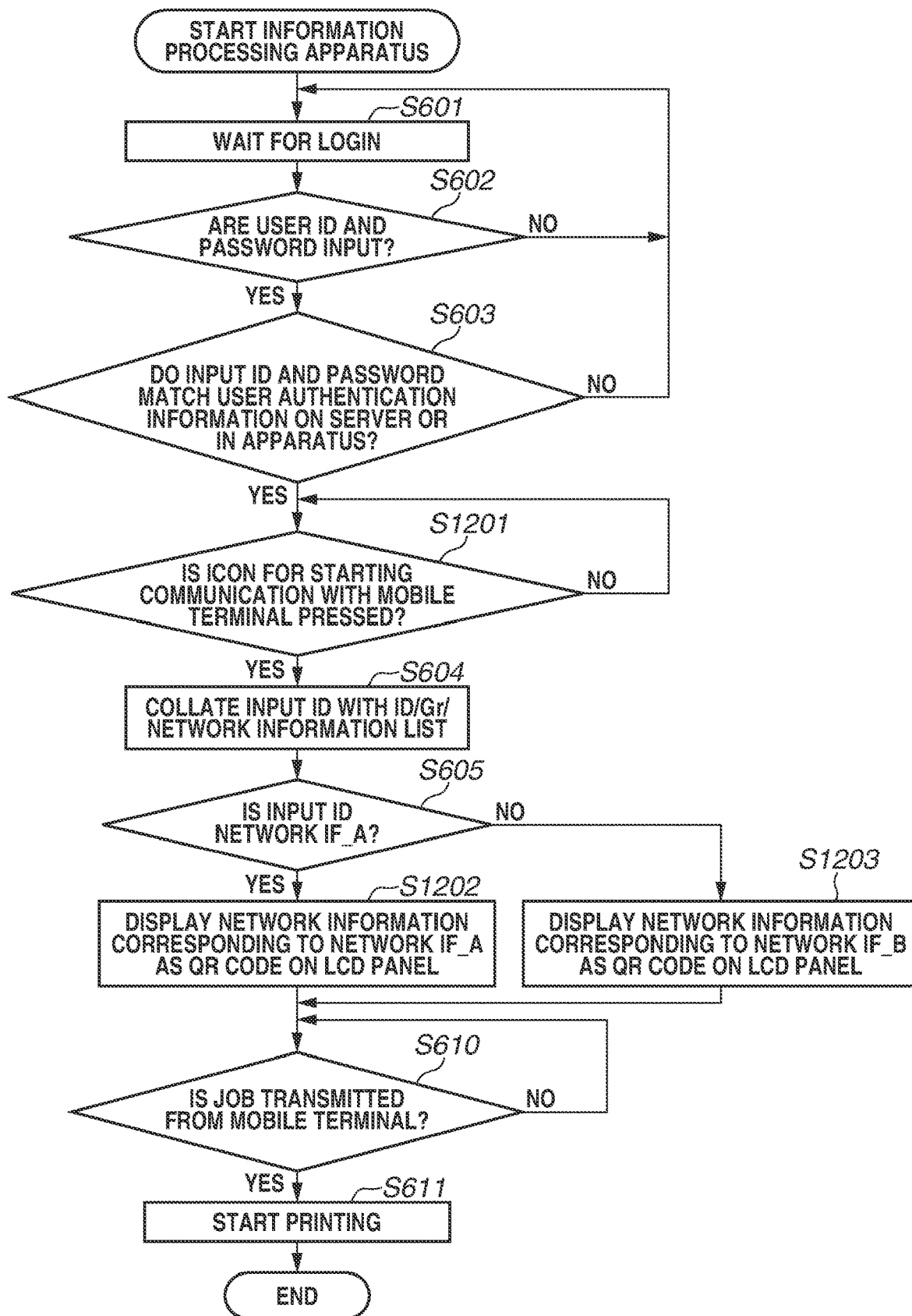

FIGS. 11A and 11B are flowcharts illustrating an example of a series of processes from when a job is transmitted to the information processing apparatus 1 in which QR Code® display is installed until when the job is processed. The CPU 211 or 203 reads a program stored in the ROM 212 and executes the program to execute the flowcharts in FIGS. 11A and 11B. The following describes the differences from the process performed by the information processing apparatus 1 including the NFC unit 3 or the Bluetooth® Low Energy unit 6.

FIG. 11A illustrates a process performed by the CPU 211 in the controller 204 of the information processing apparatus 1 in the series of processes from when a job is transmitted to the information processing apparatus 1 which displays network information using the QR Code® 803 until when the job is processed.

In step S603, in a case where the CPU 211 in the controller 204 determines to allow login (YES in step S603), then in step S1201, the CPU 203 of the operation unit 2 determines whether the icon (not illustrated) for starting communication with the mobile terminal 100 is pressed.

In a case where the CPU 203 determines that the icon is pressed (YES in step S1201), then in step S604, the CPU 211 compares the user ID of the user allowed to log in by the processing in step S603 with the list 501.

In step S605, the CPU 211 determines the network IF Gr to be used by the user among the plurality of network IF Grs. For example, in the case of the user of the user ID "3", the network IF Gr is "B" (NO in step S605), and the processing proceeds to step S1203. On the other hand, in a case where the network IF Gr is "A" (YES in step S605), the processing proceeds to step S1202.

In step S1202, since the IF to be used by the user is "A", the CPU 203 of the operation unit 2 refers to the list 501 and displays the network information corresponding to the network IF_A-Gr as the QR Code® 803. The network information at this time is "172.24.1.100" of the IP address, "ABC" of the access point SSID, and "1111" of the access point password.

In step S1203, since the IF to be used by the user is "B", the CPU 203 of the operation unit 2 refers to the list 501 and displays the network information corresponding to the network IF_B-Gr as the QR Code® 803. The network information at this time is "172.24.1.200" of the IP address, "DEF" of the access point SSID, and "2222" of the access point password. Steps S610 and S611 are the same as in FIG. 5C described above, and thus their description is omitted herein.

The following describes a process performed by the mobile terminal 100, with reference to FIG. 11B.

In step S612, the CPU 101 of the mobile terminal 100 activates a job transmission application 209 for transmitting a job to the information processing apparatus 1. In step S1204, the CPU 101 of the mobile terminal 100 displays a message that prompts the user to read the QR Code®. In step S1205, the CPU 101 of the mobile terminal 100 determines whether network information is read from the QR Code®. In a case where the CPU 101 determines that the network information is read (YES in step S1205), the processing proceeds to step S616.

In step S616, the CPU 101 of the mobile terminal 100 connects to the information processing apparatus 1 via an access point in the wireless LAN communication 410 using the acquired network information.

In step S617, the CPU 101 of the mobile terminal 100 displays a screen (not illustrated) for setting and checking setting information for transmitting a job to the information processing apparatus 1. Examples of setting information include color/monochrome settings and stapling-on/off settings.

In step S618, the CPU 101 of the mobile terminal 100 determines whether "YES" is pressed or "NO" is pressed on the screen for setting and checking as described above. In a case where the CPU 101 determines that "NO" is pressed (NO in step S618), the processing returns to step S617.

In a case where the CPU 101 determines that "YES" is pressed (YES in step S618), the processing proceeds to step S619, and the CPU 101 of the mobile terminal 100 transmits a job to the information processing apparatus 1.

The present exemplary embodiment produces a similar advantage to that produced by the first and second exemplary embodiments in the case of using a mobile terminal that does not include an NFC communication unit and/or a Bluetooth® LE communication unit.

In the first exemplary embodiment described above, the example is described in which the memory unit 303 of the NFC unit 3 stores network information about a single IF. In a fourth exemplary embodiment, an example will be described below in which the memory unit 303 of the NFC unit 3 stores network information about a plurality of IFs, which is mainly the difference from the first exemplary embodiment.

FIGS. 12A, 12B, 12C, and 12D are flowcharts illustrating an example of a series of processes including a writing process of IP addresses of a plurality of network IFs to the memory unit 303 of the NFC unit 3. The CPU 211 or 203 reads a program stored in the ROM 212 and executes the program to execute the flowcharts in FIGS. 12A to 12C.

The following describes the process performed by the CPU 211 in the controller 204 of the information processing apparatus 1, with reference to FIG. 12A.

Steps S601 and S602 are the same as in FIG. 5A described above, and thus descriptions are omitted herein. In step S603, in a case where the CPU 211 determines to allow login (YES in step S603), then in step S1301, the CPU 203 of the operation unit 2 writes both the network information about the network IF_A 401 and the network information about the network IF_B 411 to the memory unit 303 of the NFC unit 3.

Figure 12D:
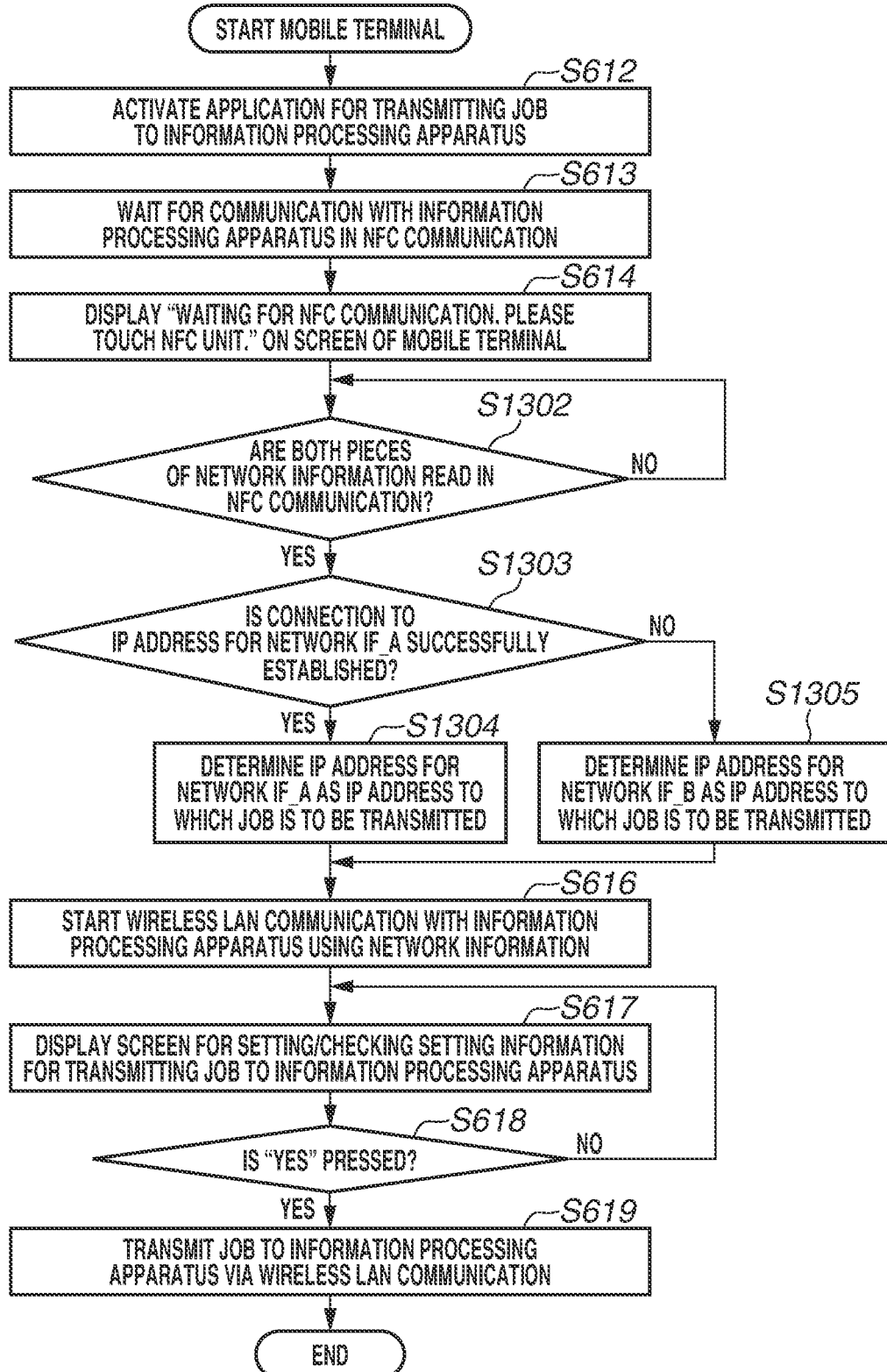

FIGS. 12B and 12C are the same as FIGS. 5B and 5C described above, and thus descriptions are omitted herein. The following describes a process performed by the mobile terminal 100, with reference to FIG. 12D.

In step S612, the CPU 101 of the mobile terminal 100 activates a job transmission application 209 for transmitting a job to the information processing apparatus 1.

In step S613, the CPU 101 of the mobile terminal 100 waits for communication with the information processing apparatus 1 in the NFC communication 310.

In step S614, the CPU 101 of the mobile terminal 100 displays the message "Waiting for NFC communication. Please touch NFC unit." on the operation unit 104.

In step S1302, the CPU 101 of the mobile terminal 100 determines whether the network information about the network IF_A 401 and the network information about the network IF_B 411 are both successfully recognized (or read) in the NFC communication 310. In a case where the CPU 101 determines that the network information about the network IF_A 401 and the network information about the network IF_B 411 are both successfully recognized (YES in step S1302), the processing proceeds to step S1303.

In step S1303, the CPU 101 of the mobile terminal 100 determines whether a connection to the IP address for the network IF_A 401 is successfully established.

In a case where a connection is successfully established (YES in step S1303), in step S1304, the CPU 101 of the mobile terminal 100 determines the IP address for the network IF_A 401 as the IP address to which a job is to be transmitted. In the example, "172.24.1.100" is determined. In a case where a connection is not successfully established (NO in step S1303), in step S1305, the mobile terminal 100 determines the IP address for the network IF_B 411 as the IP address to which a job is to be transmitted. In the example, "172.24.1.200" is determined.

In step S616, the CPU 101 of the mobile terminal 100 connects to the information processing apparatus 1 via an access point in the wireless LAN communication 410 using the acquired network information.

In step S617, the CPU 101 of the mobile terminal 100 displays a screen (not illustrated) for setting and checking setting information for transmitting a job to the information processing apparatus 1. Examples of setting information include color/monochrome settings and stapling-on/off settings.

In step S618, the CPU 101 of the mobile terminal 100 determines whether "YES" is pressed or "NO" is pressed on the screen for setting and checking as described above. In a case where the CPU 101 determines that "NO" is pressed (NO in step S618), the processing returns to step S617.

In a case where the CPU 101 determines that "YES" is pressed (YES in step S618), the processing proceeds to step S619, and the CPU 101 of the mobile terminal 100 transmits a job to the information processing apparatus 1.

In the present exemplary embodiment, the information processing apparatus 1 that stores the network information about the plurality of IFs in the memory unit 303 of the NFC unit 3 is described as an example. Alternatively, the memory unit 603 of the Bluetooth® LE unit 6 can store the network information about the plurality of IFs or the QR Code® 803 can include the network information about two IFs.

The above-described first to third exemplary embodiments can be combined as needed. For example, the network information can be stored in the memory unit 303 of the NFC unit 3 and also in the memory unit 603 of the Bluetooth® LE unit 6.

Each of the above-described exemplary embodiments enables a user allowed to use an information processing apparatus via a plurality of network IFs to use the information processing apparatus using an arbitrary network.

The above-described exemplary embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
a plurality of network interfaces;
a storage configured to store a plurality of pieces of different network information respectively assigned to the plurality of network interfaces;
a display; and
one or more controllers configured to:
identify a user who logged in the information processing apparatus;
select, as network information to be displayed as a two-dimensional code, network information corresponding to the identified user from among the stored plurality of pieces of network information; and
display the selected network information on the display as the two-dimensional code.

2. The information processing apparatus according to claim 1, wherein the network information includes at least a service set identifier (SSID) of an access point, a password, and a unique identifier of the network interface.

3. The information processing apparatus according to claim 2, wherein the unique identifier of the network interface is an Internet Protocol (IP) address or a media access control (MAC) address.

4. The information processing apparatus according to claim 1, wherein the two-dimensional code of the information processing apparatus is a Quick Response (QR) code®.

5. The information processing apparatus according to claim 1,
wherein each of the stored plurality of pieces of network information is assigned to at least one group from among a plurality of different groups, and
wherein the one or more controllers identify a group corresponding to the identified user from among the plurality of groups and select the network information assigned to the identified group as the network information to be displayed as the two-dimensional code.

6. The information processing apparatus according to claim 1, wherein the one or more controllers are configured to receive data transmitted from an external apparatus via a communication established based on the selected network information.

7. The information processing apparatus according to claim 6, wherein printing is executed using the received data.

8. The information processing apparatus according to claim 1, wherein a correspondence relationship between the user and the network information is changed by an administrator.

9. The information processing apparatus according to claim 1, wherein the one or more controllers are configured to establish communication with an external apparatus according to the selected network information, wherein the established communication is wireless communication without any apparatuses between the information processing apparatus and the external apparatus.

10. An information processing apparatus comprising:
a plurality of network interfaces;
a storage configured to store a plurality of pieces of different network information respectively assigned to the plurality of network interfaces; and
one or more controllers configured to:
select network information corresponding to a login ID used for the current login from among the stored plurality of pieces of network information; and
output information corresponding to the selected network information,
wherein each of the stored plurality of pieces of network information is assigned to at least one group from among a plurality of different groups, and
wherein the one or more controllers select network information corresponding to the login ID, identify a group corresponding to the login ID from among the plurality of groups, and select the network information assigned to the identified group as the network information to be output.

11. The information processing apparatus according to claim 10, wherein the network information includes at least a service set identifier (SSID) of an access point, a password, and a unique identifier of the network interface.

12. The information processing apparatus according to claim 11, wherein the unique identifier of the network interface is an Internet Protocol (IP) address or a media access control (MAC) address.

13. The information processing apparatus according to claim 10, wherein the outputted information is outputted as display information displayed on a display.

14. The information processing apparatus according to claim 13, wherein the display information is a two-dimensional code.

15. The information processing apparatus according to claim 14, wherein the two-dimensional code of the information processing apparatus is a Quick Response (QR) code®.

16. The information processing apparatus according to claim 10, wherein the one or more controllers are configured to receive data transmitted from an external apparatus via a communication established based on the selected network information.

17. The information processing apparatus according to claim 16, wherein printing is executed using the received data.

18. The information processing apparatus according to claim 10, wherein a correspondence relationship between the login ID and the network information is changed by an administrator.

19. The information processing apparatus according to claim 10, wherein the one or more controllers are further configured to establish communication with an external apparatus according to the selected network information,
wherein the established communication is wireless communication without any apparatuses between the information processing apparatus and the external apparatus.

20. The information processing apparatus according to claim 10, wherein the outputted information is outputted via a near field communication (NFC) unit.

21. The information processing apparatus according to claim 10, wherein the outputted information is outputted via a Bluetooth® Low Energy unit.

22. The information processing apparatus according to claim 10, wherein, in a case where a plurality of pieces of network information corresponds to the login ID, network information to be written to a memory unit of a near field communication (NFC) unit or a memory unit of a Bluetooth® Low Energy unit is selected.

* * * * *